US011163810B2

(12) United States Patent
Kube et al.

(10) Patent No.: US 11,163,810 B2
(45) Date of Patent: Nov. 2, 2021

(54) MULTI-MODEL APPROACH FOR JOB RECOMMENDATION PLATFORM

(71) Applicant: Optum, Inc., Minnetonka, MN (US)

(72) Inventors: Dale Elliot Kube, Chaska, MN (US); Marcia Renee Coonrod, Saint Peters, MN (US)

(73) Assignee: Optum, Inc., Minnetonka, MN (US)

( * ) Notice: Subject to any disclaimer, the term of this patent is extended or adjusted under 35 U.S.C. 154(b) by 105 days.

(21) Appl. No.: 16/410,683

(22) Filed: May 13, 2019

(65) Prior Publication Data
US 2020/0364250 A1   Nov. 19, 2020

(51) Int. Cl.
*G06F 16/332* (2019.01)
*G06N 5/00* (2006.01)
*G06F 16/335* (2019.01)
*G06F 16/33* (2019.01)

(52) U.S. Cl.
CPC ........ *G06F 16/3322* (2019.01); *G06F 16/335* (2019.01); *G06F 16/3334* (2019.01); *G06N 5/003* (2013.01)

(58) Field of Classification Search
None
See application file for complete search history.

(56) References Cited

U.S. PATENT DOCUMENTS

| | | | |
|---|---|---|---|
| 8,818,910 B1 | 8/2014 | Liu et al. | |
| 8,914,383 B1 | 12/2014 | Weinstein et al. | |
| 8,977,618 B2 | 3/2015 | Chen et al. | |
| 10,032,385 B2 | 7/2018 | DeFreitas et al. | |
| 10,108,932 B2 | 10/2018 | Sung et al. | |
| 10,152,695 B1 | 12/2018 | Chiu et al. | |
| 10,607,273 B2 * | 3/2020 | Su | G06N 20/10 |
| 2002/0111843 A1 * | 8/2002 | Wellenstein | G06Q 10/063112 705/7.14 |
| 2013/0036066 A1 * | 2/2013 | Telahun | G06Q 50/01 705/321 |
| 2014/0122355 A1 | 5/2014 | Hardtke et al. | |
| 2015/0310393 A1 | 10/2015 | Bhaskaran et al. | |
| 2018/0173804 A1 * | 6/2018 | Kenthapadi | G06F 16/9038 |
| 2018/0218328 A1 * | 8/2018 | Kenthapadi | G06Q 10/1053 |
| 2018/0232751 A1 * | 8/2018 | Terhark | G06Q 10/063118 |

(Continued)

OTHER PUBLICATIONS

Paparrizos et al., "Machine Learned Job Recommendation," Proceedings of the Fifth Association for Computing Machinery (ACM) Conference on Recommender Systems, Oct. 27, 2011, pp. 325-328, New York, New York. DOI: http://dx.doi.org/10.1145/2043932.2043994.

*Primary Examiner* — Uyen T Le
(74) *Attorney, Agent, or Firm* — Alston & Bird LLP

(57) ABSTRACT

A job recommendation system automatically generates job recommendations for users based at least in part on automatically generated and/or automatically maintained employee data stored within employee profiles and employer structure data. The employer structure data is utilized to generate one or more predictive models for generating scores predictive of job transitions between jobcodes and/or departments. Moreover, the employee data is compared against job opening data to identify similarity scores therebetween. The one or more predictive models and the one or more similarities scores are combined into a job recommendation algorithm utilized to generate one or more job recommendations for the user.

18 Claims, 8 Drawing Sheets

(56) References Cited

U.S. PATENT DOCUMENTS

| | | | |
|---|---|---|---|
| 2019/0050750 A1* | 2/2019 | Le | G06F 16/9535 |
| 2019/0087916 A1* | 3/2019 | Wang | G06Q 50/01 |
| 2019/0114593 A1* | 4/2019 | Champaneria | G06F 16/3325 |
| 2020/0302398 A1* | 9/2020 | Wali | G06N 20/00 |
| 2020/0311162 A1* | 10/2020 | Xu | G06Q 10/063112 |

* cited by examiner

FIG. 8

MULTI-MODEL APPROACH FOR JOB RECOMMENDATION PLATFORM

BACKGROUND

Current job recommendation systems and platforms have many deficiencies, such as requiring substantial user input for providing a plurality of different types of data deemed necessary for proper functionality of the job recommendation system. Due at least in part to the input-intensive nature of these systems, users generally do not receive highly-accurate output of job recommendations. Therefore, users are often required to expend an additional amount of time in sorting through irrelevant job recommendations when seeking a new job.

Through applied effort and ingenuity, various embodiments satisfy the above-mentioned needs as discussed in greater detail herein.

BRIEF SUMMARY

In general, embodiments of the present invention provide methods, apparatus, systems, computing devices, computing entities, and/or the like.

In accordance with one aspect, a job recommendation platform for automatically generating one or more job recommendations from one or more job openings is provided. In certain embodiments, the job recommendation platform comprises one or more memory storage areas; and one or more processors collectively configured to: receive, from one or more automatically maintained data stores, employee data for a plurality of employees, the employee data comprising a plurality of employee profiles each identifying employee job characteristics for each of the plurality of employees; receive, from the one or more automatically maintained data stores, employer structure data for at least one employer, the employer structure data comprising jobcode data for a plurality of jobcodes existing within the employer, and department data for a plurality of departments existing within the employer; receive job opening data indicative of at least one job opening within the employer; execute, based at least in part on the employer structure data and the employee data, at least one of: (1) a jobcode model identifying a likelihood of one or more jobcode-to-jobcode transitions or (2) a department model identifying a likelihood of one or more department-to-department transitions; generate, based at least in part on the job opening data and the employee profiles, fit data indicative of similarities between at least one employee profile and at least one job opening; execute a job recommendation algorithm comprising: (1) the at least one of the jobcode model or the department model and (2) the fit data; and generate a job recommendations interface comprising one or more job recommendations generated by the job recommendation algorithm for the at least one employee profile.

In various embodiments, the processors are collectively configured to execute the jobcode model and the department model, and wherein the job recommendation model comprises the jobcode model and the department model. Moreover, the jobcode model and the department model may each comprise one or more random forest models. In certain embodiments, each of the employee profiles comprise prior probability data indicative of previous jobcode-to-jobcode transitions and prior department-to-department transitions of a corresponding employee. Moreover, the jobcode model is configured to generate jobcode scores for movement between each of a plurality of jobcodes. In certain embodiments, the one or more processors are further configured to store, within the one or more memory storage areas, at least one jobcode having a highest score for a previous jobcode identified within an employee profile. In certain embodiments, the department model is configured to generate department scores for movement between each of a plurality of departments. Moreover, the one or more processors may be further configured to store, within the one or more memory storage areas, at least one department having a highest score for a previous department identified within an employee profile.

In accordance with a second aspect, a computer-implemented method for automatically generating job recommendations for one or more users is provided. In various embodiments, the method comprises receiving, via one or more processors and from one or more automatically maintained data stores, employee data for a plurality of employees, the employee data comprising a plurality of employee profiles each identifying employee job characteristics for each of the plurality of employees; receiving, via the one or more processors and from the one or more automatically maintained data stores, employer structure data for at least one employer, the employer structure data comprising jobcode data for a plurality of jobcodes existing within the employer, and department data for a plurality of departments existing within the employer; receiving, via the one or more processors, job opening data indicative of at least one job opening within the employer; executing, via the one or more processors and based at least in part on the employer structure data and the employee data, at least one of: (1) a jobcode model identifying a likelihood of one or more jobcode-to-jobcode transitions or (2) a department model identifying a likelihood of one or more department-to-department transitions; generating, via the one or more processors and based at least in part on the job opening data and the employee profiles, fit data indicative of similarities between at least one employee profile and at least one job opening; executing, via the one or more processors, a job recommendation algorithm comprising: (1) the at least one of the jobcode model or the department model and (2) the fit data; and generating, via the one or more processors, a job recommendations interface comprising one or more job recommendations generated by the job recommendation algorithm for the at least one employee profile.

In certain embodiments, the method further comprises executing the jobcode model and the department model, and wherein the job recommendation model comprises the jobcode model and the department model. Moreover, the jobcode model and the department model may each comprise random forest models. In certain embodiments, each of the employee profiles comprise prior probability data indicative of previous jobcode-to-jobcode transitions and prior department-to-department transitions of a corresponding employee. Moreover, the jobcode model is configured to generate jobcode scores for movement between each of a plurality of jobcodes.

In various embodiments, the method further comprises storing, within the one or more memory storage areas, at least one jobcode having a highest score for a previous jobcode identified within an employee profile. Moreover, the department model may be configured to generate department scores for movement between each of a plurality of departments. In certain embodiments, the method further comprises storing, within the one or more memory storage areas, at least one department having a highest score for a previous department identified within an employee profile.

In accordance with another aspect, a non-transitory computer-readable storage medium storing executable portions therein is provided. In various embodiments, the executable portions are configured to, when executed by one or more processors, cause the processors to: receive, from one or more automatically maintained data stores, employee data for a plurality of employees, the employee data comprising a plurality of employee profiles each identifying employee job characteristics for each of the plurality of employees; receive, from the one or more automatically maintained data stores, employer structure data for at least one employer, the employer structure data comprising jobcode data for a plurality of jobcodes existing within the employer, and department data for a plurality of departments existing within the employer; receive job opening data indicative of at least one job opening within the employer; execute, based at least in part on the employer structure data and the employee data, at least one of: (1) a jobcode model identifying a likelihood of one or more jobcode-to-jobcode transitions or (2) a department model identifying a likelihood of one or more department-to-department transitions; generate, based at least in part on the job opening data and the employee profiles, fit data indicative of similarities between at least one employee profile and at least one job opening; execute a job recommendation algorithm comprising: (1) the at least one of the jobcode model or the department model and (2) the fit data; and generate a job recommendations interface comprising one or more job recommendations generated by the job recommendation algorithm for the at least one employee profile.

In certain embodiments, the executable portions are further configured to cause one or more processors to execute the jobcode model and the department model, and wherein the job recommendation model comprises the jobcode model and the department model. Moreover, in various embodiments, the jobcode model and the department model each comprise random forest models. In accordance with various embodiments, each of the employee profiles comprise prior probability data indicative of previous jobcode-to-jobcode transitions and prior department-to-department transitions of a corresponding employee. Additionally, the jobcode model may be configured to generate jobcode scores for movement between each of a plurality of jobcodes. In certain embodiments, the executable portions are further configured to cause one or more processors to store, within the one or more memory storage areas, at least one jobcode having a highest score for a previous jobcode identified within an employee profile. Moreover, the department model may be configured to generate department scores for movement between each of a plurality of departments. In various embodiments, the executable portions are further configured to cause one or more processors to store, within the one or more memory storage areas, at least one department having a highest score for a previous department identified within an employee profile.

BRIEF DESCRIPTION OF THE SEVERAL VIEWS OF THE DRAWINGS

Reference will now be made to the accompanying drawings, which are not necessarily drawn to scale, and wherein:

FIGS. 6-8 show example graphical user interface screens providing data to a user in accordance with certain embodiments.

DETAILED DESCRIPTION

Figure 1:
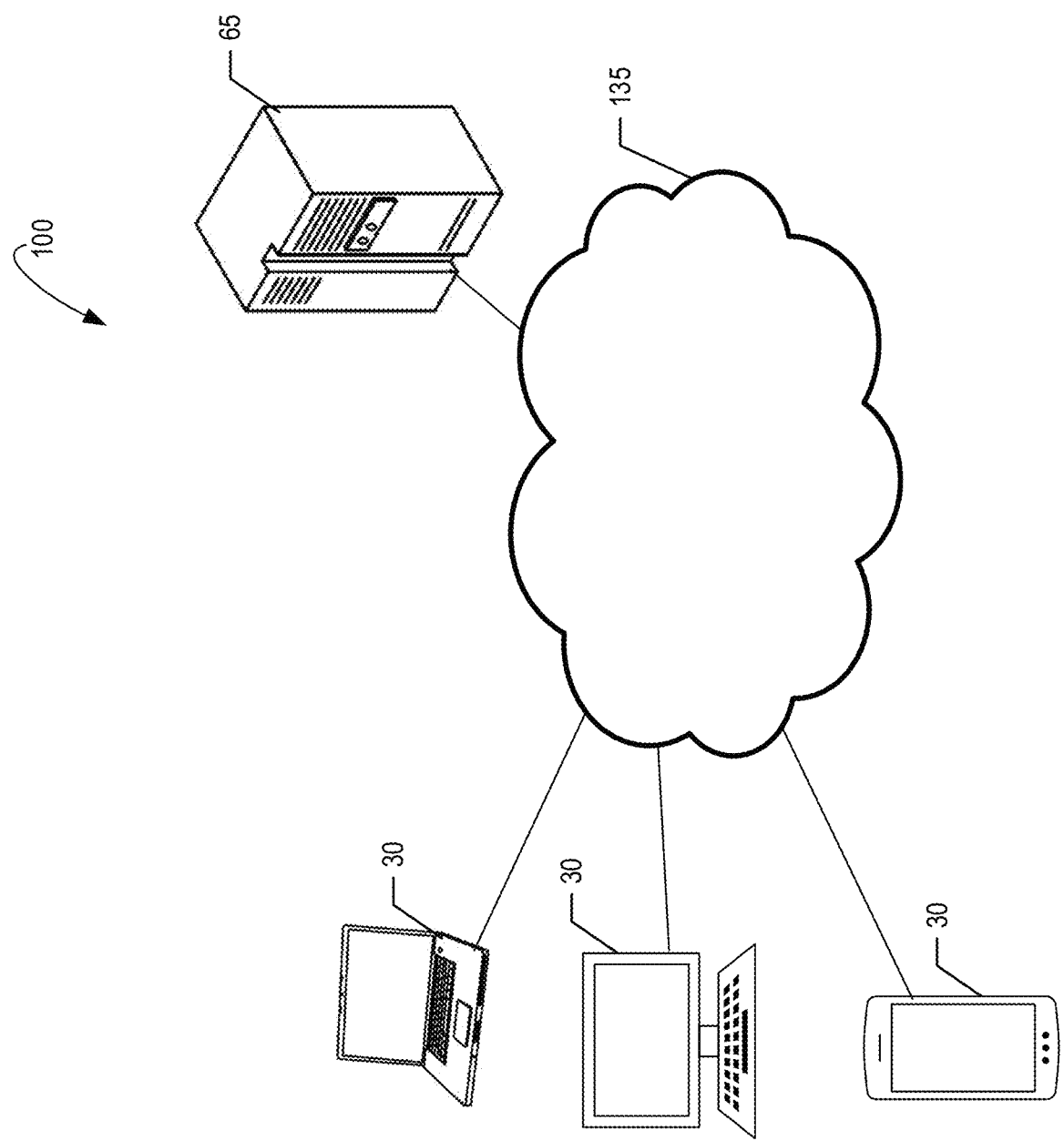
FIG. 1 is a diagram of an exemplary recommendation platform that can be used in conjunction with various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

In accordance with certain embodiments, the recommendation platform provides detailed job recommendations for a user (which may be an employee of a particular employer, a recruiter seeking job recommendations for a job candidate, and/or the like. The detailed job recommendations being selected from an existing listing of job openings stored within an automatically maintained data store (e.g., a personnel management system), based at least in part on user data (also referred to herein as employee data where the user is an employee of a particular employer) corresponding to the user/employee. The user data may be retrieved from an automatically maintained personnel management system for a particular employer, thereby making various embodiments particularly suitable for recommending intra-employer job changes for users.

The user data utilized by the recommendation platform may comprise employee profiles each comprising data indicative of the user's current job title, current job code, current grade (or rank, the terms being utilized interchangeably herein) within the employer, the length of time the user has been in his/her current job, the user's previous job titles, the business (department or subunit of the employer) in which the user is currently employed, previous businesses/departments of the employer in which the user has been previously employed, and/or the like. The recommendation platform may utilize one or more aspects of the user data to generate one or more models to score the likelihood of the user moving into one or more other job roles (reflected by uniquely identifying jobcodes), businesses/departments, and/or the like.

The recommendation platform may then utilize the generated scores to train one or more models, such as random forest models, to determine a prediction score for the user with one or more job openings (e.g., based on the similarity of those job openings with the one or more job roles and/or businesses deemed most relevant to the user). In certain embodiments, determinations of a prediction score for each of a plurality of job openings may be further based at least in part on fit scores generated for comparison between user/employee characteristics (e.g., job skills) and job opening descriptions, for example based on determined textual (or other characteristic) similarities between aspects of the user data (e.g., listings of the user's job skills) and requirements listed in association with the one or more job openings.

Utilizing the various data and comparisons generated by the recommendation platform, job openings deemed most relevant to user's current career circumstances (encompassing the user's current job skill set, the user's current grade/rank within an employer, the user's current (or past) job responsibilities, and/or the like) may receive high relevance scores, and those job openings may thus be presented to the user as recommended job openings via a graphical user interface. The system may be configured such that a user need only provide basic identifying data, such as a user identifier and/or password (or such data may be automatically determined based metadata provided by the user's computing entity when requesting access to the system) to generate accurate and highly specialized job opening recommendations for the user.

The recommendation platform may be further configured to generate inverse recommendations based on the generated data as well. Such inverse recommendations may be embodied as recommended candidates for particular job openings. As the data already provides relevance scores for combinations of users and job openings, these same relevance scores may be utilized to identify the most-relevant job candidates for a particular job opening. Thus, a recruiter portal to the recommendation platform may comprise one or more graphical user interfaces providing recommended candidates for job openings made available by the recruiter.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a recommendation platform 100 that can be used in conjunction with various embodiments of the present invention. As shown in FIG. 1, the recommendation platform 100 may comprise one or more recommendation server systems 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Recommendation Server System

Figure 2:
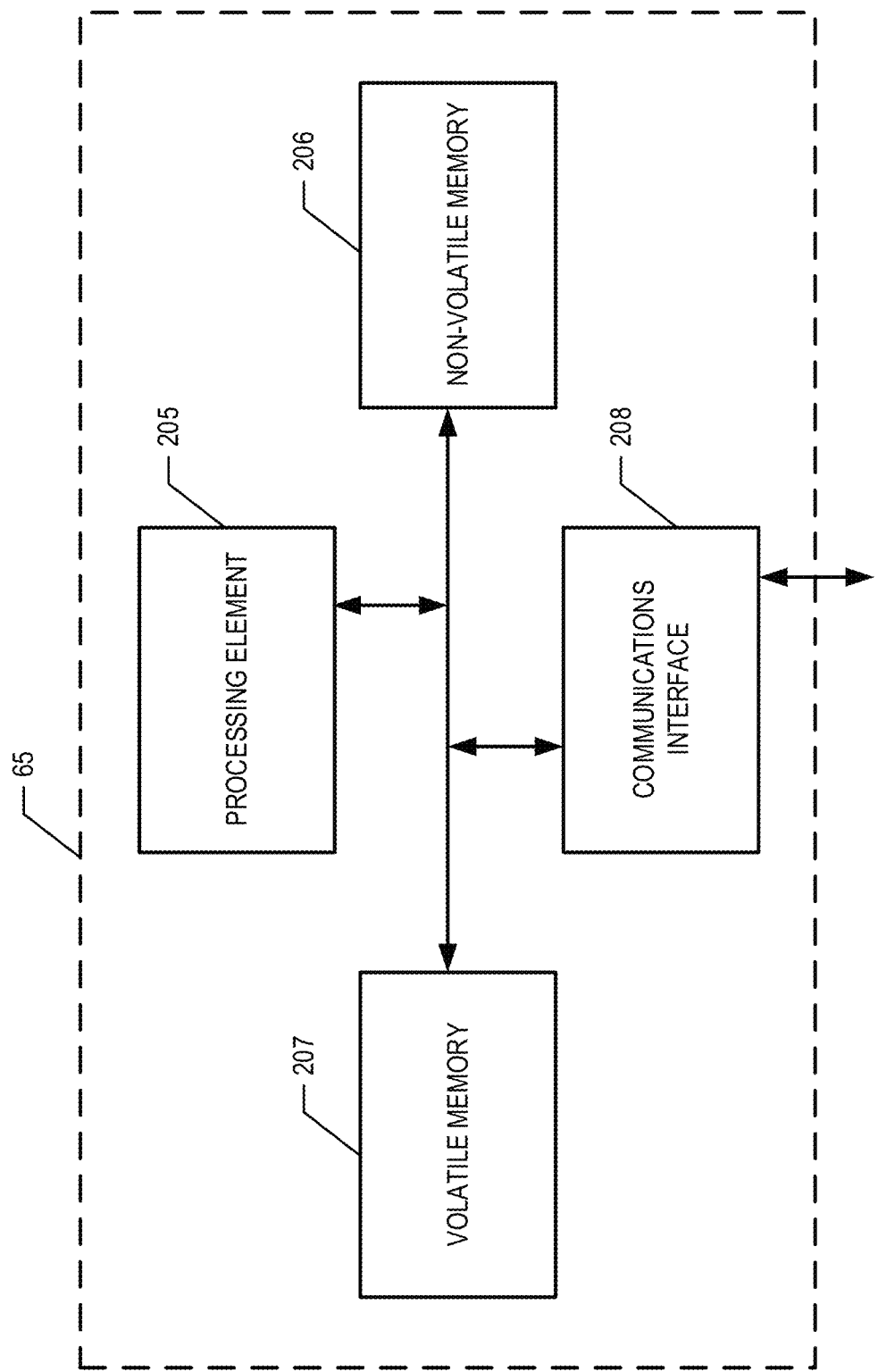
FIG. 2 is a schematic of an exemplary recommendation server system in accordance with certain embodiments of the present invention.

FIG. 2 provides a schematic of an exemplary recommendation server system 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the recommendation server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the recommendation server system 65 may communicate with other computing entities, one or more user computing entities 30, and/or the like.

As shown in FIG. 2, in one embodiment, the recommendation server system 65 may include or be in communication with one or more processing elements 205 (also referred to as processors, processing circuitry, and/or similar terms used herein interchangeably) that communicate with other elements within the recommendation server system 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the recommendation server system 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored data is stored centrally in a location within the system and other data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the data required for the operation of the recommendation system may be stored. As a person of ordinary skill in the art would recognize, the data required for the operation of the recommendation system may also be partially stored in the cloud data storage system and partially stored in a locally maintained data storage system.

Memory media 206 may include data accessed and stored by the recommendation system to facilitate the operations of the system. More specifically, memory media 206 may encompass one or more data stores configured to store data usable in certain embodiments.

In one embodiment, the recommendation server system 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the recommendation server system 65 with the assistance of the processing element 205 and operating system.

As indicated, in one embodiment, the recommendation server system 65 may also include one or more network and/or communications interfaces 208 (e.g., for messages, for voice calls, for chats, and/or the like) for communicating with various computing entities, such as by communicating data, content, information, and/or similar terms used herein interchangeably that can be transmitted, received, operated on, processed, displayed, stored, and/or the like. For instance, the recommendation server system 65 may communicate with computing entities or communication interfaces of other computing entities, user computing entities 30, and/or the like.

As indicated, in one embodiment, the recommendation server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, as fiber distributed data interface (FDDI), digital subscriber line (DSL), Ethernet, asynchronous transfer mode (ATM), frame relay, data over cable service interface specification (DOCSIS), or any other wired transmission protocol. Similarly, the recommendation server system 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The recommendation server system 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the recommendation server's components may be located remotely from other recommendation server system 65 components, such as in a distributed system. Furthermore, one or more of the components may be aggregated and additional components performing functions described herein may be included in the recommendation server system 65. Thus, the recommendation server system 65 can be adapted to accommodate a variety of needs and circumstances.

b. Exemplary User Computing Entity

Figure 3:
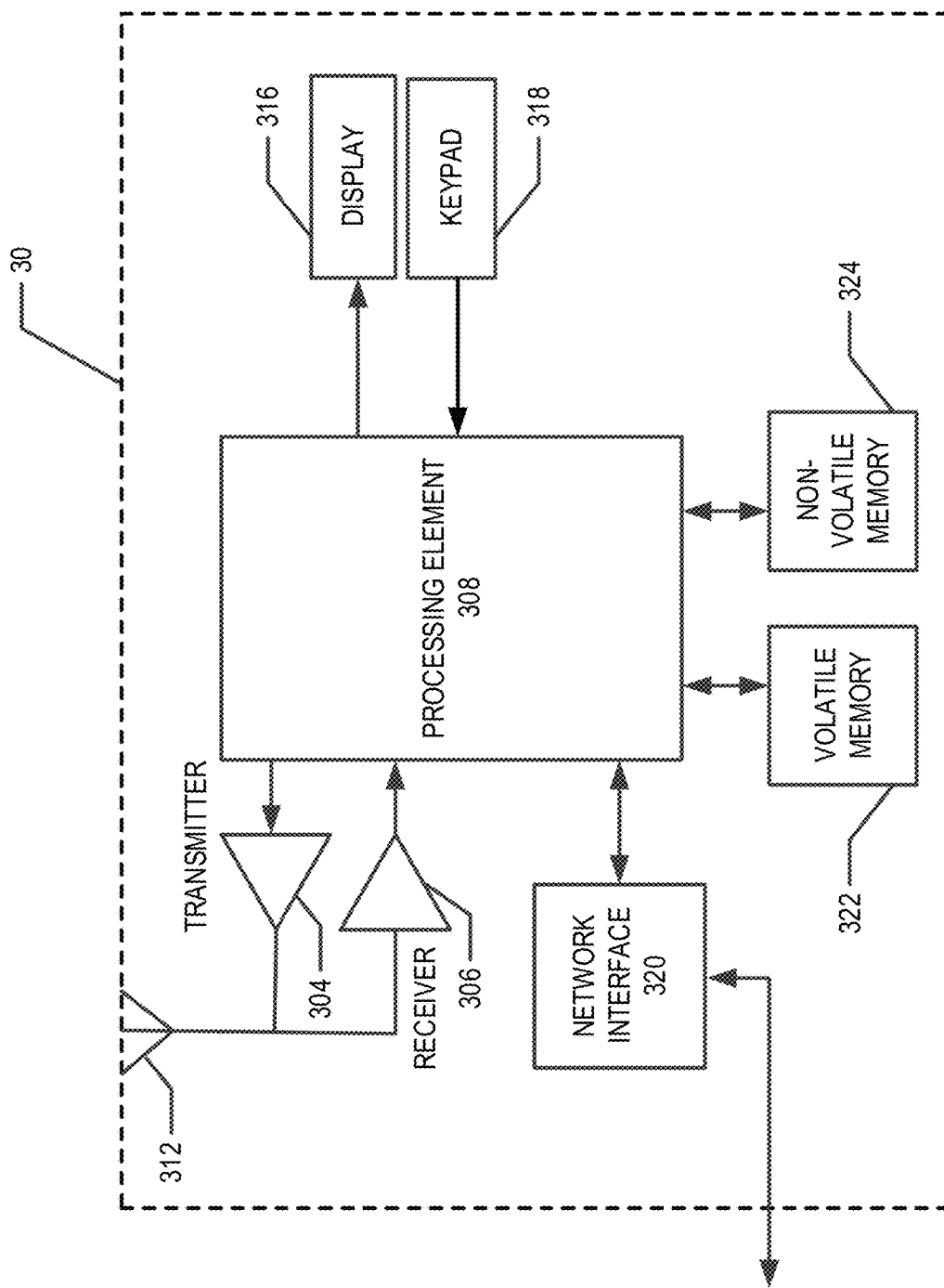
FIG. 3 is a schematic of an exemplary user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the recommendation server system 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling data in accordance with an air interface standard of applicable wireless systems to communicate with various entities, such as a recommendation server system 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising or in communication with one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of data and for user recommendation therewith via one or more user input interfaces. The user output interface may be updated dynamically from communication with the recommendation server system 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect data, user recommendation/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 4-8.

a. Technical Problems

As will be recognized, current solutions for generating job recommendations for job candidates (and/or for generating candidate recommendations for particular job openings) are inefficient and manual in nature. The following provides examples of some of the current inefficient and manual recommendations.

Job recommendation systems often rely on a significant amount of user input to generate appropriate job recommendations for potential job candidates. Job candidates generally must provide manual input of prior job history, data indicative of the type of job desired and/or the type of business or industry the candidate desires, data indicative of a location where the user desires to find a job, data indicative of the user's current job skills, data indicative of the user's level of education, and/or the like. Because these job recommendation systems require such large amounts of manual user interaction, users often forget to include certain pieces of desired data, or perhaps the users do not recognize that a particular piece of data is relevant to the user's current job search. Moreover, users may have incomplete data when first beginning a job search, such that the user may entirely miss potentially relevant job opportunities for the user. As just one example, a job candidate having an interest in data science related jobs may search for job titles of "data scientist," "data engineer," "database specialist," and/or the like. However, the user may not realize that other jobs, such as "business market analyst" may have job duties that are very similar to the desired data science roles in particular businesses/industries; therefore, the user may entirely overlook these potentially relevant job opportunities merely because the user does not have complete data about the various ways in which a particular job function may be described in different businesses/industries.

Moreover, job skills may be described in non-standardized ways, such that simple matching algorithms that search for matches between a user's stated skills and job openings' stated job requirements entirely miss various potential matches therebetween. For example, one user may describe his/her own skill set as encompassing Microsoft Word® skills, whereas another user and/or job opening may require skills more generically as "word processing skills." Further to the above, a particular user may deem a particular skill so basic that he/she does not even mention the skill in user input provided to a job recommendation system, which may then result in a large number of potential job openings being entirely filtered out and never shown to the user. Thus, existing systems are entirely incapable of identifying analogous skills if provided in non-standardized ways, and/or for determining whether a particular individual, user, employee, and/or similar words used herein interchangeably likely has a particular skill.

These and other problematic characteristics of certain job recommendation systems are particularly acute for employers seeking to maintain and redeploy existing employees within other departments or areas of the employer. Thus, if a particular employee seeks a new role, existing technologies provide little support for helping to find that employee a new role within his/her current employer.

Through applied effort and ingenuity, various embodiments overcome these technical challenges using various technical solutions.

b. Technical Solutions

To overcome at least the above-identified technical challenges, embodiments of the present invention provide technical solutions for leveraging existing user data sources (e.g., within personnel management systems) to automatically generate job recommendations for users based on data stored from these existing user data sources. Thus, users need not generate and provide a significant amount of user input for job recommendation systems, thereby significantly decreasing user friction which may prevent users from searching for new job opportunities. Particularly for retaining employees within an employer, such a simplification to the job search system may increase the attractiveness of the user's seeking new roles within the employer, rather than immediately searching for new roles with potentially different employers.

Furthermore, by utilizing existing user data for determining appropriate job recommendations for users, the recommendations are based on a complete set of data corresponding to the particular user, rather than a set of data encompassing only what a user remembers to provide. Thus, such recommendation systems remove potential errors introduced by required user input, thereby ensuring high degrees of accuracy in providing recommended job openings to users.

The accuracy of job recommendations provided to users are further improved by automatically generating one or more machine learning models that predict/determine a likelihood of a user moving into a particular role and/or a particular business. These models may be machine learning based models trained based on other user data stored within the existing storage systems, such that recommended jobs for users are not determined purely based on the user's potentially limited knowledge of job duties associated with other available job openings. Thus, recommended job openings for users may be determined based at least in part on models illustrating how other users have moved between job roles in the past.

The job recommendations may be further supplemented based at least in part on determined similarities between a user's skills (and/or other characteristics) and a job opening's required skills (and/or other characteristics). However, certain embodiments further expand how such relationships are established to determine matches between user characteristics and corresponding job opening characteristics, based at least in part on standardized descriptions of various characteristics and/or skills and/or based at least in part on fuzzy logic matching between skills and/or characteristics. Determinations of similarity scores between user skills and required skills of a job opportunity may be made based at least in part on text mining enabling the system to differentiate between job openings based at least in part on written qualifications associated with those job openings.

c. Data Collection and Feature Engineering

Figure 4:
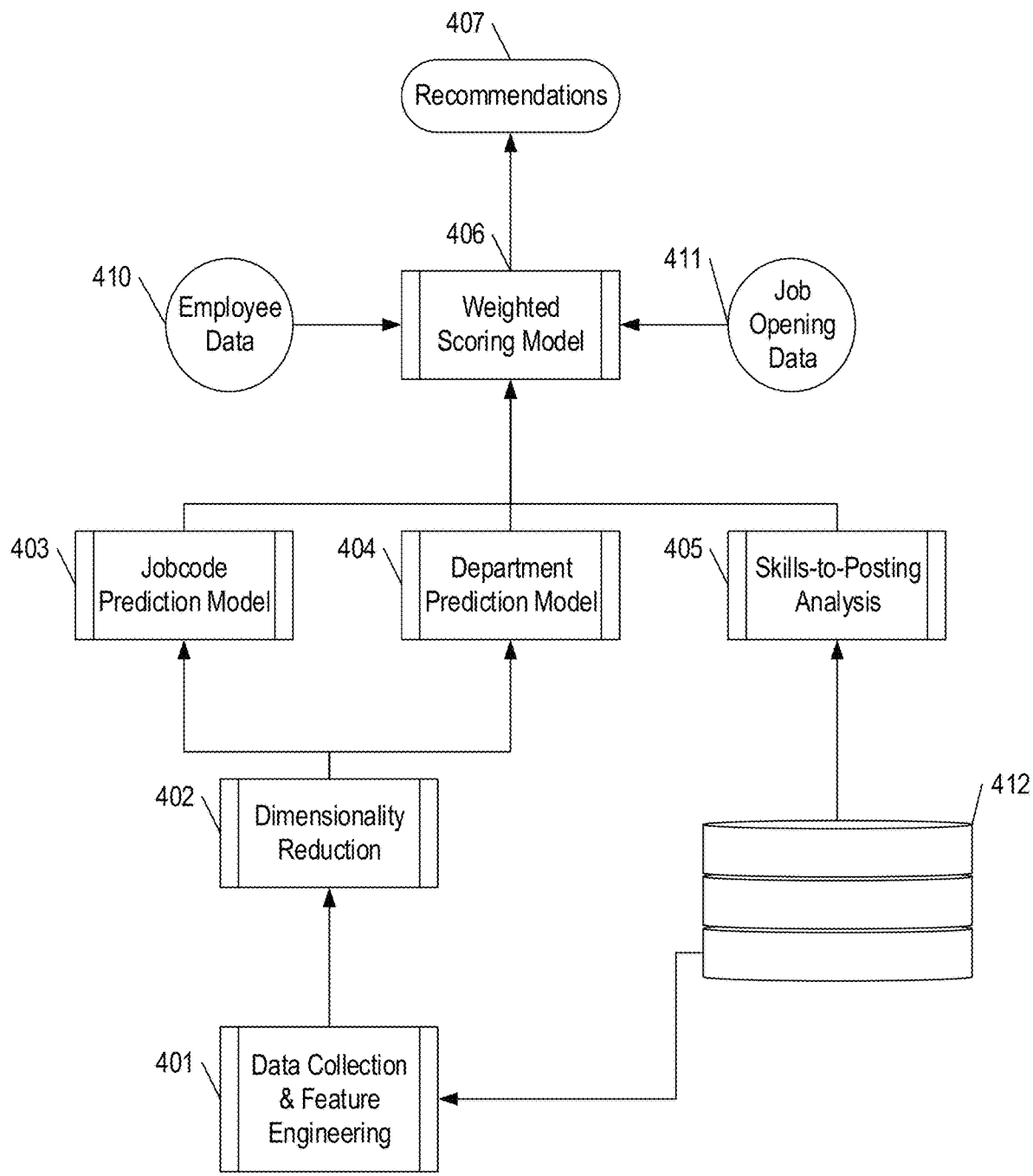
FIG. 4 shows a schematic of example recommendations between components and/or processes of various embodiments.
Figure 5:
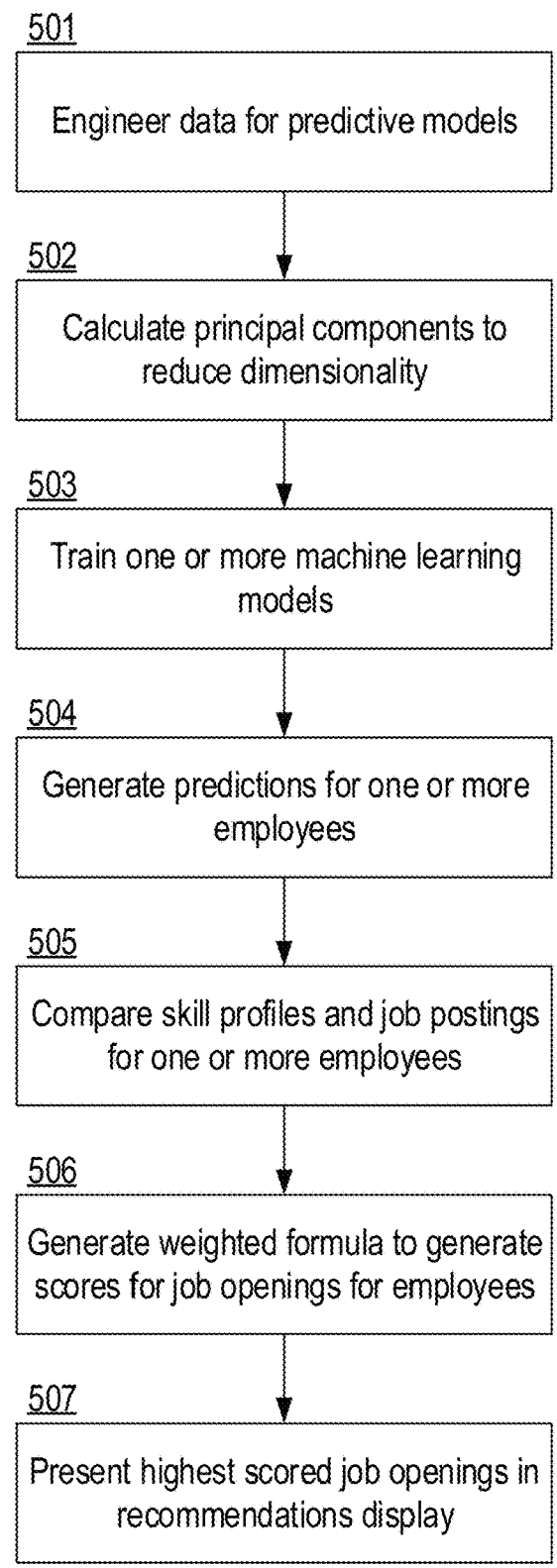
FIG. 5 shows a flowchart of example processes according to various embodiments.

FIG. 4 illustrates various processes performed to provide relevant job recommendations to users and FIG. 5 provides a flowchart illustrating steps in accordance with the processes of FIG. 4. As noted herein, the various processes are performed automatically, without significant user input that may lead to incomplete or inaccurate determinations of recommendations for a user. Thus, as indicated at Block 401 of FIG. 4 and step 501 of FIG. 5, operation of certain embodiments may begin with data collection and feature engineering to be utilized to generate (e.g., train) and/or retrain one or more machine learning models for developing job recommendations. Although FIG. 4 illustrates the data collection and feature engineering process as relying on a single data source (e.g., database 412) accessible to the recommendation platform 100, it should be understood that various embodiments retrieve data from a plurality of data sources, including intra-company data sources storing employee data, public data sources (e.g., indicative of job movement trends), employee-specific data sources (e.g., social media profiles associated with a particular individual/employee), and/or the like.

As just one example, data may be retrieved from one or more personnel management systems for use in developing appropriate machine learning models, such as one or more jobcode prediction models and/or one or more department prediction models. The personnel management system may store employee data for one or more employees within respective employee profiles each storing data indicative of job characteristics of the respective employee, including employment history (e.g., data indicative of prior roles held by the employee within a particular employer, data indicative of prior roles held by the employee outside of a particular employer (if the personnel management system is configured for inter-employment data collection and/or if the personnel management system is provided with such data, for example, upon hiring a new employee), and/or the like).

In certain embodiments, the personnel management system may further store employer structure data, providing data of the structure of a particular employer organization. The employer structure data may comprise department data indicative of various departments/businesses within a particular employer (e.g., each identified based at least in part on unique business/department identifiers). The employer structure data may further utilize unique identifiers to distinguish between various jobs within an employer and/or to denote similar job roles within different areas of the employer. For example, unique jobcodes may be assigned to particular jobs (e.g., alphanumeric codes, numeric codes, and/or the like), thereby providing a distinction between otherwise similar jobs that may be described with a similar/identical job title. These jobcodes may be reflected within the employer structure data together with job descriptions and/or other data reflective of characteristics of the jobcodes (e.g., typical ranks of employees having the particular jobcode; locations associated with the jobcode; businesses/departments having the jobcode; and/or the like). Moreover, jobcodes may be utilized consistently across subunits/businesses of an employer, such that the same role in different employer subunits is provided with an identical jobcode. For example, an equipment sales representative may be assigned jobcode ABC123 within a heavy-equipment division of a particular employer, and another equipment sales representative may be assigned the same jobcode ABC123 within a light-duty equipment division of the same employer. However, it should be understood that jobcodes may be unique to particular subunits of a particular employer, thereby enabling the personnel management system to distinguish between employer subunits based on the jobcode alone. For example, an equipment sales representative may be assigned jobcode ABC123-HD within a heavy-equipment division of a particular employer, and another equipment sales representative may be assigned jobcode ABC123-LT within a light-duty equipment division of the same employer. In other embodiments, subunits/businesses of a particular employer may be distinguished via other identifiers, such as via division identifiers that may be separately stored within the personnel management system.

Example personnel management systems that may be utilized as data sources for the recommendation platform 100 comprise, for example, PeopleSoft Human Resource Management Systems (offered by Oracle, Corporation), WorkDay (offered by WorkDay, Inc.), and/or the like. It should be understood that other personnel management systems, such as human-resource specific software applications, may be utilized in certain embodiments. Moreover, in certain embodiments, the recommendation platform 100 may retrieve data from a plurality of personnel management systems. For example, a first personnel management system may store data indicative of employer structure data, a second personnel management system may store data indicative of employees' current job characteristics (e.g., current jobcode, current level/rank, and/or the like), and a third personnel management system may store data indicative of employees' skills. In other embodiments, a plurality of personnel management systems may provide overlapping data (e.g., a plurality of personnel management systems may all store employee skill data), and accordingly the recommendation platform 100 may be configured to retrieve data from the plurality of personnel management systems and to reduce the same to decrease the dimensionality of the resulting data.

The recommendation platform 100 may query one or more personnel management systems to identify data indicative of relevant transactions (e.g., jobcode-to-jobcode movements). These transactions may be identified specifically for a particular user, or the transactions may be identified globally for all users (e.g., all current employees, all current and prior employees, and/or the like). In the latter embodiments, data indicative of relevant transactions may be sanitized of identifying data that may be usable to identify a user related to the transaction data (e.g., if necessary to satisfy applicable privacy requirements). The data indicative of relevant transactions may comprise data indicative of a pre-change jobcode, a post-change jobcode (relating to a particular job transition between jobcodes and/or between departments), user skills (e.g., pre-change user skills), time-of-year (e.g., determined based at least in part on a transaction date), time-in-position (e.g., pre-change amount of time the user was in the pre-change jobcode prior to the transaction), the pre-change grade, the post-change grade, the pre-change tenure (e.g., the length of time the user was employed by the employer, the length of time the user was employed by a particular business/sub-unit of the employer, and/or the like), the user's education, and/or the like. In certain embodiments, the recommendation platform 100 may further retrieve prior probability data indicative of historical job movements associated with various employees. For example, the prior probability data may be indicative of where other users having a particular jobcode have moved in the past (e.g., which other jobcodes have other users moved to, and with what frequency have users made these moves in the past; which other businesses/sub-units of an employer have particular individuals having particular jobcodes and/or businesses moved in the past; and/or the like). It should be understood that the above-mentioned data is provided merely as examples, and other features may be retrieved by the recommendation system as well for generation of job recommendation models.

In certain embodiments, as machine learning models (e.g., jobcode prediction model and/or department prediction model) are developed and modified over time, the data retrieved from the one or more data sources may vary. Based on the data available to the recommendation system (e.g., data that may be retrieved from one or more data sources, for example, in response to queries generated by the recommendation system), the recommendation system engineers data features determined to be indicative of predicting job changes, such that the data may be utilized to generate machine learning models and/or algorithmic models (e.g., comprising one or more machine learning models) providing users with high-levels of accuracy in predicting jobs that may be determined to be relevant to the user.

d. Dimensionality Reduction

With reference now to Block 402 of FIG. 4 and Block 502 of FIG. 5, after receiving the data to be utilized for providing job recommendations, the job recommendation platform 100 calculates principal components to project feature dimensionality into a smaller feature space. This enables the machine learning models to achieve optimal performance and avoid problems associated with overfitting models to retrieved data, which may itself decrease the performance of the recommendation models. Dimensionality reduction may be performed on the retrieved data to identify those aspects of each retrieved dataset that are most important in generating job recommendations for users. Distinctions between data that are not determined to be relevant (e.g., statistically relevant or otherwise irrelevant according to other data analysis) are removed from further analysis, thereby reducing the dimensionality of the data to focus on data portions deemed indicative of potential transitions between jobs for users.

It should be understood that any of a variety of techniques may be utilized for reducing the dimensionality of datasets to avoid problems of overfitting and to ensure optimal performance of systems for generating models for providing job recommendations.

e. Machine Learning Model Training

With reference now to Blocks 403-404 of FIG. 4, the recommendation platform 100 thereafter generates/trains one or more machine learning models based on the retrieved data (e.g., based on the dimensionally reduced data (e.g., dimensionally reduced employee data provided within one or more employee profiles), based on the employer structure data, and/or the like) to provide predictions of potential job transitions (e.g., between jobcodes and/or between departments) for various users. These machine learning models may be trained generally, based at least in part on data received for a plurality of employees (e.g., current employees and/or prior employees). Moreover, as noted above, the machine learning models may be employer-specific, such that the machine learning models generated are indicative of the particular circumstances associated with work within a particular employer. In various embodiments, the one or more trained machine learning models may comprise one or more random forest models; however, other machine learning models and machine learning approaches may be utilized in certain embodiments.

As reflected within FIG. 4, the recommendation platform 100 may generate/train a plurality of machine learning models configured for generating predictions/recommendations of particular aspects of user job transitions. For example, the one or more machine learning models may comprise a jobcode prediction model (as reflected at Block 403), configured to generate predictions of jobcodes deemed most relevant to a particular user/employee. The one or more machine learning models may further comprise a department prediction model 404, configured to generate predictions of departments (businesses/subunits of an employer, and/or the like) deemed most relevant to a particular employee/user. As other examples of models that may be generated, particularly for use in large, conglomerate-style employers, the one or more models may further comprise industry prediction models which may provide a prediction of a particular industry (an industry may comprise a plurality of businesses and/or subunits) deemed most relevant to a particular user/employee. It should be understood that other models may be generated as well in accordance with various embodiments.

With reference first to Block 403, the one or more jobcode prediction models may generate a probability score for every available jobcode-to-jobcode transition reflected within the employer structure data (as mentioned above, the employer structure data may comprise data indicative of each of the plurality of jobcodes available within the employer). The one or more jobcode prediction models reflected at Block 403 may not consider what job openings are currently available, and instead may generate a matrix of probability scores for every possible jobcode-to-jobcode transition within a particular employer, based at least in part on the employer structure data. In certain embodiments, the recommendation platform 100 is configured to periodically update the one or more jobcode prediction models, and to regenerate probability scores for every available jobcode-to-jobcode transition based on the updated model. For example, as additional data becomes available (e.g., reduced employee data reflective of actual jobcode transitions of various employees), retrieved and dimensionally reduced as indicated at Blocks 401-402 of FIG. 4), the recommendation platform 100 retrains the one or more jobcode prediction models to reflect the newly available data. In certain embodiments, the recommendation platform 100 retrains the one or more jobcode prediction models daily (e.g., overnight) to reflect data generated during a prior day or in response to certain triggers (e.g., newly identified features).

The one or more jobcode prediction models are generated and trained based at least in part on a plurality of factors within the reduced dataset discussed above. Thus, when considering the circumstances of a particular individual employee to determine a likely job transition (if any) to another jobcode, the one or more jobcode prediction models are configured to utilize the multi-factor model to determine how the combination of facts associated with a particular individual are likely to be determinative of a possible jobcode transition for the individual. As just a few examples, the one or more jobcode prediction models may utilize data such as (1) the current time of year (e.g., promotions to a higher grade/rank may be determined to occur shortly after an annual performance review period); (2) tenure of the employee with the employer; (3) time-in-position at current jobcode; (4) education level (e.g., various jobcodes may be restricted to employees having a certain minimum or maximum education level); (5) prior jobcode probabilities (e.g., determined for one or more individual employees, previous transitions between jobcodes may be deemed indicative of possible future movements to new jobcodes); (6) current grade/rank (e.g., various jobcodes are limited to employees having a particular grade/rank, and changes in grade/rank may be typically minimal for any given jobcode change); (7) location (e.g., certain jobcodes may only exist in particular locations); and/or the like. It should be understood that other factors and/or data may be utilized with respect to a determining jobcode prediction score for a particular individual employee.

As mentioned, the one or more jobcode prediction models may be trained based on at least a portion of the reduced dataset noted above. Utilizing the reduced dataset noted above for training a jobcode prediction model (which itself comprise a random forest model configured to provide a usable model for generating a score indicative of the likelihood of a jobcode transition based on the specific circumstances/characteristics of a particular employee, as reflected within an employee profile), provides a highly detailed and accurate scoring model for the one or more jobcode prediction models. Moreover, as further noted above, the one or more jobcode prediction models may be updated periodically (e.g., retrained periodically) as new data becomes available. As specific examples referencing the data types noted above, time-of-year data may be expected to change daily (e.g., the date changes daily), and prior jobcode probability data may be expected to change at least periodically (e.g., as at least one employee transitions to a new role, data indicative of the employee's transition may be utilized to update probabilities of movement between one or more jobcodes).

Once the one or more jobcode prediction models are generated and trained using the reduced data, the recommendation platform 100 executes the one or more jobcode prediction models for each of a plurality of individual employees to generate jobcode prediction scores for each of the plurality of individual employees, as reflected at Block 504 of FIG. 5. Execution of the one or more jobcode prediction models in certain embodiments comprises retrieving employee data stored within an employee profile for a particular employee (e.g., reduced employee data), and applying the one or more jobcode prediction models to the retrieved employee data (e.g., by executing the one or more jobcode prediction models utilizing various employee data as variables of the one or more jobcode prediction models). The output of the one or more jobcode prediction models are a jobcode prediction score for each of a plurality of jobcodes within an employer (e.g., all jobcodes within the employer). In just one example, the one or more jobcode prediction models may be executed for all employees of an employer periodically (e.g., upon retraining the one or more jobcode prediction models) to maintain updated jobcode prediction scores for each individual.

In certain embodiments, the recommendation platform 100 is configured to store the jobcodes having the highest prediction score for each individual employee. The recommendation platform 100 may be configured to store a defined number of jobcodes and their corresponding prediction scores for each individual employee (e.g., the highest ranked 5 jobcodes, the highest ranked 3 jobcodes, and/or the like). In certain embodiments, the recommendation platform 100 may be configured to automatically determine that a particular employee's current jobcode falls within the top ranked jobcodes for storage.

With reference now to Block 404, the one or more department prediction models may generate a probability score for every available department-to-department transition. The one or more department prediction models reflected at Block 404 may not consider what job openings are currently available (and their associated departments), and instead may generate a matrix of probability scores for every possible department-to-department transition within a particular employer as reflected within department data of the employer structure data. In certain embodiments, the recommendation platform 100 is configured to periodically update the one or more department prediction models, and to regenerate probability scores for every available department-to-department transition based on the updated model. For example, as additional data becomes available (e.g., data indicative of prior department-to-department transitions for one or more employees, retrieved and dimensionally reduced as indicated at Blocks 401-402 of FIG. 4), the recommendation platform 100 retrains the one or more department prediction models to reflect the newly available data. In certain embodiments, the recommendation platform 100 retrains the one or more department prediction models daily (e.g., overnight) to reflect data generated during a prior day or in response to certain triggers.

The one or more department prediction models are generated based at least in part on a plurality of factors within the reduced dataset discussed above. Thus, when considering the circumstances of a particular individual employee to determine a likely job transition (if any) to another department, the one or more department prediction models are configured to utilize the multi-factor model generated for the one or more department prediction models to determine how the combination of facts associated with a particular individual are likely to be determinative of a possible department change for the individual. As just a few examples, the one or more department prediction models may utilize data, such as (1) the current time of year (e.g., promotions to a higher grade/rank and/or movements between departments may be determined to occur shortly after an annual performance review period); (2) tenure of the employee with the employer; (3) time-in-position at current jobcode and department; (4) education level (e.g., various jobcodes and/or departments may be restricted to employees having a certain minimum or maximum education level); (5) prior department probabilities (e.g., determined for an individual employee, previous movements between departments may be deemed indicative of possible future transitions to new a department); (6) current grade/rank (e.g., various jobcodes and/or departments are limited to employees having a particular grade/rank, and changes in grade/rank may be typically minimal for any given jobcode and/or department change); (7) job function; (8) location (e.g., certain departments may only exist in particular locations); and/or the like. It should be understood that other factors and/or data may be utilized with respect to determining a department prediction score for a particular individual employee.

As mentioned, the one or more department prediction models may be trained based on at least a portion of the reduced dataset noted above. Utilizing the reduced dataset noted above for training a department prediction model (which itself may comprise a random forest model configured to provide a usable model for generating a score indicative of the likelihood of a department transition based on the specific circumstances/characteristics of a particular employee, as reflected within an employee profile), provides a highly detailed and accurate scoring model for the one or more department prediction models. Moreover, as further noted above, the one or more department prediction models may be updated periodically (e.g., retrained periodically) as new data becomes available. As specific examples referencing the data types noted above, time-of-year data may be expected to change daily (e.g., the date changes daily), and prior department probability data may be expected to change at least periodically (e.g., as at least one employee transitions to a new role, data indicative of the employee's transition may be utilized to update probabilities of movement between one or more departments).

Once the one or more department prediction models are generated and trained using the reduced data, the recommendation platform 100 executes the one or more department prediction models for each of a plurality of individual employees to generate department prediction scores for each of the plurality of individual employees (as reflected at Block 504 of FIG. 5). Execution of the one or more department prediction models in certain embodiments comprises retrieving employee data stored within an employee profile for a particular employee (e.g., reduced employee data), and applying the one or more department prediction models to the retrieved employee data (e.g., by executing the one or more department prediction models utilizing various employee data as variables of the one or more department prediction models). The output of the one or more department prediction models are a department prediction score for each of a plurality of departments within an employer (e.g., all departments within the employer). In just one example, the one or more department prediction models may be executed for all employees of an employer periodically (e.g., upon retraining the one or more department prediction models) to maintain updated department prediction scores for each individual.

In certain embodiments, the recommendation platform 100 is configured to store the departments having the highest department prediction score for each individual employee. The recommendation platform 100 may be configured to store a defined number of departments and their corresponding prediction scores for each individual employee (e.g., the highest ranked 5 departments, the highest ranked 3 departments, and/or the like). In certain embodiments, the recommendation platform 100 may be configured to automatically determine that a particular employee's current department falls within the top ranked departments for storage.

Via the one or more jobcode prediction models 403 and the one or more department prediction models 404, the recommendation platform 100 identifies the most likely jobcodes that each of a plurality of individual employees are likely to transition into (including, in certain instances, their current jobcode) as well as the most likely departments that each of those individual employees are likely to move into (including, in certain instances, their current department). Collectively, the jobcode prediction scores and the department prediction scores are indicative of the most likely combination of jobcode and department (e.g., a particular jobcode within a particular department) that a particular employee is likely to move into.

f. Compare Skill Profiles and Job Postings

With reference now to Block 405 of FIG. 4 and Block 505 of FIG. 5, the recommendation platform 100 retrieves data regarding existing current job postings to compare against employee data (e.g., retrieved from one or more employee profiles within one or more personnel management systems). As illustrated in FIG. 4, the processes associated with Block 405 may be performed independently of those discussed in reference to Blocks 401-404. Thus, the processes associated with Block 405 may be performed prior to those of Blocks 401-404; concurrently with the processes of Blocks 401-404; or after the processes of Blocks 401-404; as dictated by the required processing resources.

The recommendation platform 100 retrieves employee data from one or more data sources (e.g., personnel management systems). The employee data retrieved may comprise one or more employee profiles identifying job characteristics of the employee, for example, embodied as skill data indicative of each employees' job-related skills (as reflected in the one or more data sources). The recommendation platform 100 identifies, from within the retrieved employee data, data indicative of one or more employee skills for comparison with job openings. The recommendation platform 100 utilizes natural language processing (NLP) and/or text mining from textual data within employee profiles to identify one or more employee skills identified therein.

In embodiments in which the employee data is retrieved from a plurality of datasources (e.g., a plurality of personnel management systems), the recommendation platform 100 retrieves employee data from the disparate datasources and cleans and standardizes the data prior to comparing against job openings. As a specific example, in certain embodiments the recommendation platform 100 queries a plurality of datasources having overlapping (duplicate) data. Accordingly, the recommendation platform 100 removes duplicate data to reduce necessary processing resources. Moreover, data standardization and/or cleaning may be performed via one or more coding systems, such as R, Python, and/or the like, to enable direct comparisons with skill data extracted from job openings.

In various embodiments, the recommendation platform 100 standardizes skill data retrieved from employee profiles, thereby decreasing the dimensionality of the skill data. The skills may be provided within employee profiles within delimited lists, within individual categories, and/or within other formatted datasets. Thus, the recommendation platform 100 may be configured to retrieve textual representations of each skill, unique identifiers associated with each skill of a user, and/or the like. In certain embodiments, skills may be listed in a profile with a natural language formatting, and therefore the recommendation platform 100 may be configured to utilize natural language processing (NLP) to identify one or more skills within an employee's profiles.

The recommendation platform 100 additionally retrieves data indicative of one or more job openings from one or more data sources. Job opening data may be stored in association with one or more personnel management systems accessible to the recommendation platform 100. In certain embodiments, the recommendation platform 100 queries each of one or more datasources (e.g., personnel management systems storing data indicative of job openings) to retrieve data indicative of job openings. The recommendation platform 100 cleans and/or standardizes the job opening data, for example, by removing duplicate data and/or by performing one or more standardization processes provided via one or more coding systems, such as R, Python, and/or the like, to enable direct comparisons with skill data extracted from employee profiles.

The job opening data may comprise natural language descriptions of jobs and/or one or more separately listed skill requirements. Additionally, the job opening data may comprise additional identifying data for the job opening, such as a jobcode associated with the job opening, a department associated with the job opening, a location associated with the job opening, a grade/rank associated with the job opening, a salary (salary range, hourly wage, hourly wage range, and/or the like) associated with the job opening, a requested start date for the job opening, and/or the like.

In certain embodiments, because the job opening may include skills within a natural language job description associated with the job opening, the recommendation platform 100 may utilize NLP to identify relevant skills for the job opening (that may be compared against skill data retrieved from employee data profiles). Like those skills identified as associated with one or more employee profiles, the recommendation platform 100 may standardize the skills (e.g., via one or more unique skill identifiers, root words, and/or the like) to minimize the dimensionality of potential skills under consideration. As should be understood, the skill data retrieved from the job openings may be standardized consistently with the skill data retrieved from the employee data profiles, thereby enabling a comparison therebetween.

Upon retrieving skill data for employees (e.g., from employee profiles) and skill data for job openings (e.g., from job opening data), the recommendation platform 100 compares a plurality of employees' skills with skill requirements for a plurality of job openings, to identify job openings for which each of one or more of the employees are qualified. Such comparisons may be performed by identifying lexical similarities between skill data retrieved from employee data and skill data retrieved from job opening data (e.g., to identify similar words used within text of skills and/or text of profiles). In other embodiments, the recommendation platform 100 identifies semantic similarities between the skills data of the employee profiles and the skills data of the job openings (e.g., by comparing free-form paragraphs of the employee profiles with free-form paragraphs of the job openings).

In certain embodiments, the recommendation platform 100 may filter job openings-to-employee combinations for exact matches (e.g., the employee has at least all of the skills associated with a particular job opening). In other embodiments, the recommendation platform 100 may filter job openings-to-employee combinations based on a threshold criteria (e.g., the employee must have at least a defined percentage of skills associated with the job openings). In yet other embodiments, the recommendation platform 100 may generate a fit score for each job opening-to-employee combination, based at least in part on the number of skills that an employee has that match the skills associated with the job opening. Thus, each potential job opening-to-employee combination may be provided with a fit score that may be utilized in later analysis for determining job recommendations for individual employees.

In various embodiments, the fit score determined for a particular comparison between an employee profile and a job opening may be determined based at least in part on identified textual similarities. As just one example, the fit score for a particular comparison between an employee profile and a job opening may be determined within a vector space model by calculating cosine similarities between the employee profile and the job opening (e.g., a measurement of distances between a vector corresponding with the employee profile and a vector corresponding with the job opening). In such embodiments, an employee vector may be calculated for each of the employee profiles based at least in part on the standardized skills associated with the employee profile and a job opening vector may be calculated for each job opening based at least in part on the standardized skills associated with the job opening. A distance between the job opening vector and the employee vector may be calculated for each of a plurality of employee-to-job-opening pairs, and the distance may be utilized as the fit score. The fit scores may then be compared to determine one or more job openings deemed most similar (e.g., having the highest fit score) for a particular employee profile. Data indicative of one or more fit scores and corresponding employee-to-job-opening pairs (e.g., the highest fit scores and/or corresponding highest rated job openings) may be stored within a memory storage area.

g. Determine Recommendations

With reference now to Block 406 of FIG. 4 and Block 506 of FIG. 5, the recommendation platform 100 utilizes a weighted scoring model to identify recommended job openings for individual employees. The weighted scoring model intakes data generated by the one or more jobcode prediction models (represented at Block 403), the one or more department prediction models (represented at Block 404), and/or the skills-to-posting analysis (represented at Block 405) to provide an accurate job recommendation prediction system configured to operate with employee specific data and/or job openings specific data to identify the most-relevant matches between employee data and job openings. Thus, the recommendation platform 100 of certain embodiments is configured to generate a weighted scoring model for each individual employee, incorporating the jobcode prediction scores, the department prediction scores, and the fit scores indicative of job opening-to-employee combination predictions for the particular employee.

Upon generating the employee-specific weighted scoring model, the recommendation platform 100 retrieves relevant employee data (represented at Block 410) and job opening data (represented at Block 411) for analysis via the employee-specific weighted scoring model generated by the recommendation platform 100. As discussed throughout this description, the employee data and job opening data may each be retrieved from one or more data sources, such as one or more personnel management systems for consideration via the employee-specific weighted scoring model. The scoring model may assign weights to each of a plurality of factors to provide specific recommendations tailored to each individual employee. As just one example, the scoring model may assign a first weight to jobcode prediction scores, a second weight to department prediction scores, a third weight to location matches (or a plurality of weights each corresponding to a particular attribute of location matching, such as building matches, city matches, state matches, and/or the like), a fourth weight to a similarity score (e.g., a fit score), and/or the like. The weighted scores may then be combined to generate an overall relevance score for a particular job opening. An example weighted scoring model is noted below.

$$SCORE = W_1 JC + W_2 D + W_3 L + W_4 S + \ldots + W_n F$$

Where SCORE is the overall relevance score; $W_1$ through $W_n$ are individual weights to be applied to various factors (e.g., a first weight $W_1$; a second weight $W_2$; a third weight $W_3$; a fourth weight $W_4$; and additional weights $W_n$ to be applied to additional factors included within the determination of the overall relevance score); JC is a jobcode prediction score; D is a department prediction score; L is a location match; S is a similarity score (e.g., a fit score); and F represents one or more additional factors to be included within the determination of the overall relevance score.

In various embodiments one or more of the factors included within the determination of the overall relevance score may be probabilistic and/or one or more of the factors may be deterministic. In certain embodiments, a single relevance score may be determined based at least in part on one or more probabilistic scores and one or more deterministic scores. For example, the jobcode prediction scores and the department prediction scores may be probabilistic and the location match, and/or similarity score may be deterministic (e.g., indicative of a binary "match" or "no-match" determination).

This weighted scoring model may then be iterated across a plurality of job openings to generate relevance scores for each of the job openings. The resulting relevance scores may be ranked to identify the most-relevant job openings, which may be subsequently presented to a user for further review and consideration.

In certain embodiments, the weighted scoring model may be iterated across all job openings, considering all jobcode prediction scores and all department prediction scores. However, certain embodiments may be configured for computing resource conservation, and may thus focus on a particular subset of job openings, and may utilize jobcode prediction scores and/or department prediction scores for a subset of all available jobcodes and/or departments. For example, the weighted prediction model may determine scores for only those job openings for which the employee has the relevant skills (or some threshold percentage of the relevant skills). Moreover, as noted above, the weighted scoring model may utilize only the subset of jobcode prediction scores and department prediction scores stored as being deemed the most-relevant jobcodes and/or the most relevant department prediction scores. In various embodiments, all job openings (or the subset of job openings deemed to have skill requirements satisfied by the employee) may be compared against those jobcodes and/or departments deemed most-relevant to a particular employee (e.g., to determine similarities between the jobcodes of certain job openings and those deemed most relevant). In other embodiments, the weighted scoring model for a particular employee may be utilized to generate relevance scores for only those job openings matching the jobcodes deemed most relevant, and/or only those job openings matching the departments deemed most relevant for the employee.

h. Present Recommendations to Users

Recommendations (represented at Block 407 of FIG. 4) may be presented to users via one or more graphical user interface screens accessible via portals, as reflected at Block 507 of FIG. 5. As discussed above, the recommendations may be generated automatically, for each of a plurality of employees with minimal or no user input received from a particular employee. Thus, the recommendations may be stored at the recommendation platform 100 such that they are easily accessible to users upon requesting the same.

Figure 6:

FIG. 6 illustrates an example graphical user interface for presenting job opening recommendations to a fictitious employee Joe Shmoe. The employee may be required to enter his/her unique employee identifier to obtain access to the job recommendations, although it should be understood that the identity of a particular employee/user may be automatically identified in certain embodiments (e.g., based at least in part on metadata generated by a computing device utilized by the user/employee to gain access to the recommendation platform 100).

As shown in FIG. 6, the graphical user interface presented to a user provides identifying data of the employee (e.g., the employee's name, job family, job function, job title, and/or the like). The graphical user interface may additionally present the most-relevant jobcodes (illustrated as "job roles") determined for the particular employee, with user-input options enabling the user to select one or more of these most-relevant jobcodes to review available job openings associated with the jobcodes of interest. In the illustrated embodiment of FIG. 6, the 3 most-relevant (e.g., highest scored) job codes are listed (together with their corresponding relevance scores) and available to the user, although the user may optionally select other jobcodes by selecting the "select another role" user interface element.

Moreover, for a particular selected jobcode ("Sr Data Scientist (ANA014)" of FIG. 6), the graphical user interface provides a listing of available job openings (listed under "Job Recommendations"), sorted based on the generated relevance scores for each available job opening. The graphical user interface may additionally comprise a relevance indicator (e.g., shown as a filled bar with descriptor term indicative of the generated relevance score) for each job opening to provide additional visual data to a user as to the relevance of a particular job opening to the user/employee. In certain embodiments, each of these job openings may be represented as interactive hyperlinks, which may be selected by a user to obtain additional detailed data about the job opening (e.g., the hyperlink may lead to a job opening-specific webpage) and/or to enable the user/employee to apply for the job opening.

As discussed above, the relevance scores for particular job opening-to-employee combinations may be utilized to identify potentially strong job candidates for particular job openings. Such data may be presented to users (e.g., recruiters) via corresponding graphical user interfaces accessible through a corresponding portal. Example graphical user interfaces configured for presentation to a recruiter are reflected in FIGS. 7-8.

Figure 7:

As shown in FIG. 7, a recruiter may gain access to the recruiter-portal of the recommendation platform 100 by entering a recruiter password, thereby providing security against unauthorized access to recruitment data. The recruiter graphical user interface may provide data as to one or more potential job candidates deemed qualified and/or recommended for one or more job openings. In certain embodiments, the job openings reflected in the graphical user interface for the recruiter may be only those job opening requisitions for which the recruiter is responsible for filling.

In the dashboard screen of FIG. 7, the number of candidates deemed recommended for each of one or more job openings are reflected. Those candidates may be classified according to candidate type, such as redeployment candidates actively seeking a new role, and/or the like. In certain embodiments, redeployment candidates may be identified as those having a particular flag within a corresponding employee profile, such as a flag indicating that the associated employee is recommended/eligible for redeployment to a new role. Other candidates may be classified via a corresponding flag (or lack of any flag) identified within a corresponding employee profile. Such flags may be generated, for example, based at least in part on user input received for a particular employee (e.g., user input identifying a particular employee as a redeployment candidate may be utilized to generate a flag within a corresponding employee profile for the particular employee).

Figure 8:
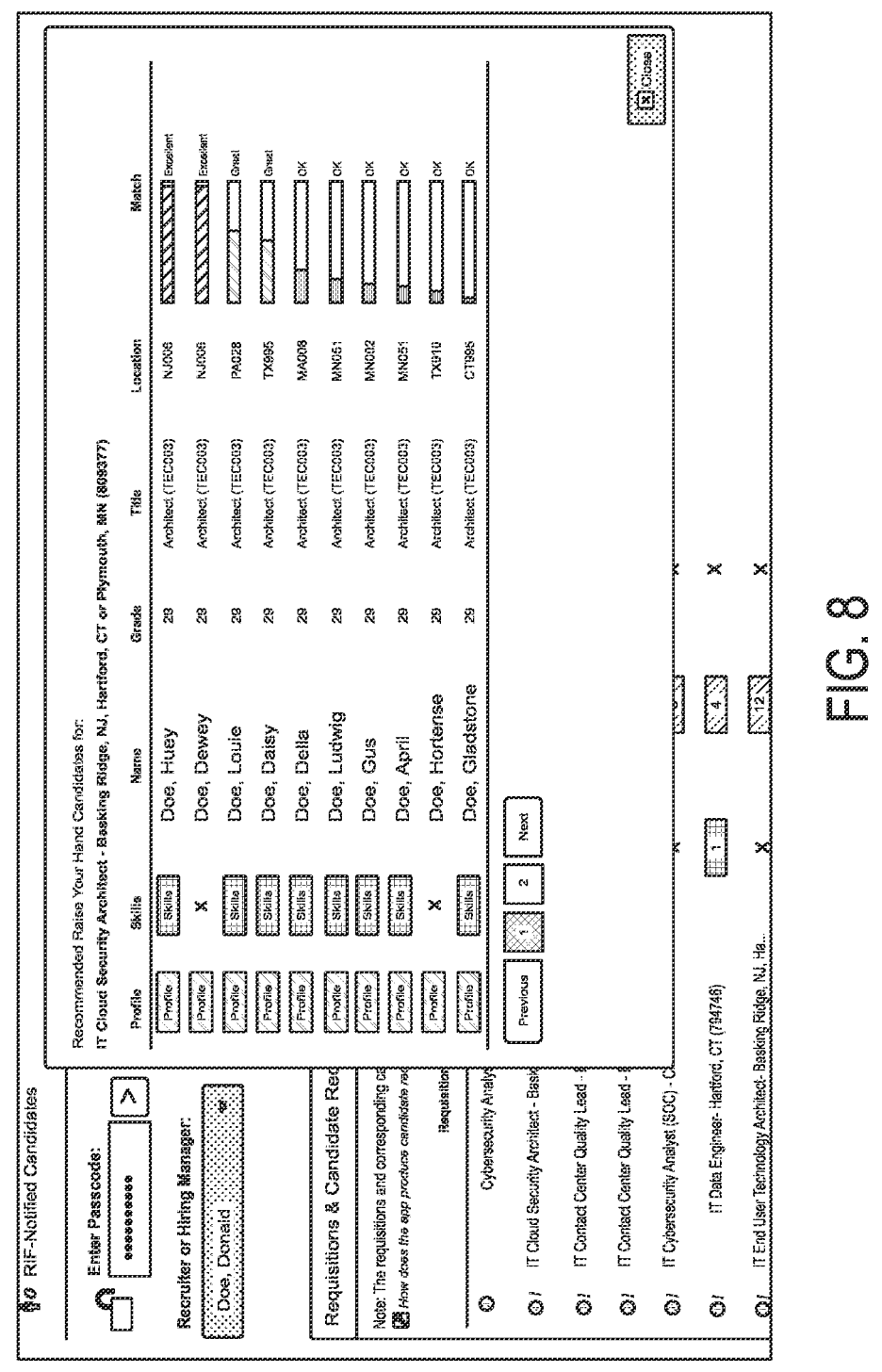

Selecting a particular job role and/or a requisition for filling a particular job role which may be assigned to a particular recruiter/user (and/or a particular candidate categorization for a particular job role) provides the recruiter/user with additional data regarding the candidates, for example, as shown in FIG. 8. The additional data may comprise the candidates' names, grade/rank, current title and/or jobcode, current location, and/or the like. The interface may additionally provide an indicator of the level of match between the candidate and the selected job opening. The relevance indicator as shown in FIG. 8 may comprise a filled bar with descriptor term indicative of the generated relevance score for each candidate for the job opening to provide additional visual data to a user as to the relevance of a particular employee to the particular job opening. Moreover, as shown in FIG. 8, the user interface may additionally comprise links to retrieve additional data regarding each candidate, such as each employee's profile and/or a listing of skills attributable to the employee. In certain embodiments, one or both of these links may additionally enable the recruiter/user to contact the candidate, for example, by transmitting an automatically generated message (e.g., via email, via messaging system, via phone, via SMS, via social network connections, and/or the like) to the candidate requesting that the candidate tell the recruiter whether the candidate is interested in the particular job opening. This automatically generated message may, in certain embodiments, comprise data indicative of the job opening (e.g., a job description, location, salary range, and/or the like), a hyperlink to a job description page, a hyperlink to reply to the recruiter, and/or the like.

IV. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A job recommendation computing system for automatically generating one or more job recommendations from one or more job openings, the job recommendation computing system comprising:
    one or more memory storage areas; and
    one or more processors collectively configured to:
        receive, from one or more automatically maintained data stores, employee data for a plurality of employees, the employee data comprising a plurality of employee profiles each identifying employee job characteristics for each of the plurality of employees;
        receive, from the one or more automatically maintained data stores, employer structure data for at least one employer, the employer structure data comprising jobcode data for a plurality of jobcodes existing within the employer, and department data for a plurality of departments existing within the employer;
        receive job opening data indicative of at least one job opening within the employer;
        execute, based at least in part on the employer structure data and the employee data, (1) a jobcode machine-learning model identifying a likelihood of one or more jobcode-to-jobcode transitions and (2) a department machine-learning model identifying a likelihood of one or more department-to-department transitions, wherein the department machine-learning model is configured to generate department scores for movement between each of a plurality of departments;
        generate, based at least in part on the job opening data and the employee profiles, fit data indicative of similarities between at least one employee profile and at least one job opening;
        execute a job recommendation algorithm comprising: (1) the jobcode machine-learning model and the department machine-learning model and (2) the fit data; and
        generate a job recommendations interface comprising one or more job recommendations each comprising a prediction score, and wherein the one or more job recommendations are generated by the job recommendation algorithm for the at least one employee profile.

2. The job recommendation computing system of claim 1, wherein the one or more processors are further configured to store, within the one or more memory storage areas, at least one department having a highest score for a previous department identified within an employee profile.

3. The job recommendation computing system of claim 1, wherein the jobcode machine-learning model and the department machine-learning model each comprise one or more random forest models.

4. The job recommendation computing system of claim 1, wherein each of the employee profiles comprise prior probability data indicative of previous jobcode-to-jobcode transitions and prior department-to-department transitions of a corresponding employee.

5. The job recommendation computing system of claim 1, wherein the jobcode machine-learning model is configured to generate jobcode scores for movement between each of a plurality of jobcodes.

6. The job recommendation computing system of claim 5, wherein the one or more processors are further configured to store, within the one or more memory storage areas, at least one jobcode having a highest score for a previous jobcode identified within an employee profile.

7. A computer-implemented method for automatically generating job recommendations for one or more users, the method comprising:
    receiving, via one or more processors and from one or more automatically maintained data stores, employee data for a plurality of employees, the employee data comprising a plurality of employee profiles each identifying employee job characteristics for each of the plurality of employees;
    receiving, via the one or more processors and from the one or more automatically maintained data stores, employer structure data for at least one employer, the employer structure data comprising jobcode data for a plurality of jobcodes existing within the employer, and department data for a plurality of departments existing within the employer;
    receiving, via the one or more processors, job opening data indicative of at least one job opening within the employer;
    executing, via the one or more processors and based at least in part on the employer structure data and the employee data, (1) a jobcode machine-learning model identifying a likelihood of one or more jobcode-to-jobcode transitions and (2) a department machine-learning model identifying a likelihood of one or more department-to-department transitions, wherein the department machine-learning model is configured to generate department scores for movement between each of a plurality of departments;
    generating, via the one or more processors and based at least in part on the job opening data and the employee profiles, fit data indicative of similarities between at least one employee profile and at least one job opening;
    executing, via the one or more processors, a job recommendation algorithm comprising: (1) the jobcode machine-learning model and the department machine-learning model and (2) the fit data; and
    generating, via the one or more processors, a job recommendations interface comprising one or more job recommendations each comprising a prediction score, and wherein the one or more job recommendations are generated by the job recommendation algorithm for the at least one employee profile.

8. The computer-implemented method of claim 7, further comprising storing, within the one or more memory storage areas, at least one department having a highest score for a previous department identified within an employee profile.

9. The computer-implemented method of claim 7, wherein the jobcode machine-learning model is configured to generate jobcode scores for movement between each of a plurality of jobcodes.

10. The computer-implemented method of claim 9, further comprising storing, within the one or more memory storage areas, at least one jobcode having a highest score for a previous jobcode identified within an employee profile.

11. The computer-implemented method of claim 7, wherein the jobcode machine-learning model and the department machine-learning model each comprise random forest models.

12. The computer-implemented method of claim 7, wherein each of the employee profiles comprise prior probability data indicative of previous jobcode-to-jobcode transitions and prior department-to-department transitions of a corresponding employee.

13. A non-transitory computer-readable storage medium storing executable portions therein, the executable portions configured to, when executed by one or more processors, cause the processors to:

receive, from one or more automatically maintained data stores, employee data for a plurality of employees, the employee data comprising a plurality of employee profiles each identifying employee job characteristics for each of the plurality of employees;

receive, from the one or more automatically maintained data stores, employer structure data for at least one employer, the employer structure data comprising jobcode data for a plurality of jobcodes existing within the employer, and department data for a plurality of departments existing within the employer;

receive job opening data indicative of at least one job opening within the employer;

execute, based at least in part on the employer structure data and the employee data, (1) a jobcode machine-learning model identifying a likelihood of one or more jobcode-to-jobcode transitions and (2) a department machine-learning model identifying a likelihood of one or more department-to-department transitions, wherein the department machine-learning model is configured to generate department scores for movement between each of a plurality of departments;

generate, based at least in part on the job opening data and the employee profiles, fit data indicative of similarities between at least one employee profile and at least one job opening;

execute a job recommendation algorithm comprising: (1) the jobcode machine-learning model and the department machine-learning model and (2) the fit data; and generate a job recommendations interface comprising one or more job recommendations each comprising a prediction score, and wherein the one or more job recommendations are generated by the job recommendation algorithm for the at least one employee profile.

14. The non-transitory computer-readable storage medium of claim 13, wherein the jobcode machine-learning model and the department machine-learning model each comprise random forest models.

15. The non-transitory computer-readable storage medium of claim 13, wherein each of the employee profiles comprise prior probability data indicative of previous jobcode-to-jobcode transitions and prior department-to-department transitions of a corresponding employee.

16. The non-transitory computer-readable storage medium of claim 13, wherein the jobcode machine-learning model is configured to generate jobcode scores for movement between each of a plurality of jobcodes.

17. The non-transitory computer-readable storage medium of claim 16, wherein the executable portions are further configured to cause one or more processors to store, within the one or more memory storage areas, at least one jobcode having a highest score for a previous jobcode identified within an employee profile.

18. The non-transitory computer-readable storage medium of claim 13, wherein the executable portions are further configured to cause one or more processors to store, within the one or more memory storage areas, at least one department having a highest score for a previous department identified within an employee profile.

* * * * *